United States Patent
Sandel (10) Patent No.: US 10,736,313 B1
(45) Date of Patent: Aug. 11, 2020

(54) HUNTING BLIND

(71) Applicant: Patrick Sandel, Deridder, LA (US)

(72) Inventor: Patrick Sandel, Deridder, LA (US)

(*) Notice: Subject to any disclaimer, the term of this patent is extended or adjusted under 35 U.S.C. 154(b) by 241 days.

(21) Appl. No.: 16/106,760

(22) Filed: Aug. 21, 2018

(51) Int. Cl.
*A01M 31/02* (2006.01)
*E04H 15/00* (2006.01)
*E04H 15/04* (2006.01)

(52) U.S. Cl.
CPC ......... *A01M 31/025* (2013.01); *E04H 15/001* (2013.01); *E04H 15/04* (2013.01)

(58) Field of Classification Search
CPC ... A01M 31/025; A01M 31/02; E04H 15/001; E04H 15/04
See application file for complete search history.

(56) References Cited

U.S. PATENT DOCUMENTS

| | | | | |
|---|---|---|---|---|
| 4,493,395 A | * | 1/1985 | Rittenhouse | A01M 31/02 108/152 |
| 4,951,696 A | * | 8/1990 | Jones, Sr. | A01M 31/025 135/90 |
| 7,219,680 B1 | * | 5/2007 | Gresock | A01M 31/025 135/139 |
| 7,958,968 B1 | | 6/2011 | Stabler | |
| 9,179,666 B1 | * | 11/2015 | Williamson | E04H 15/001 |
| 2002/0078988 A1 | * | 6/2002 | Valpredo | E04H 15/001 135/90 |
| 2017/0339941 A1 | * | 11/2017 | Burchfield | A01M 31/025 |
| 2019/0269245 A1 | * | 9/2019 | Pope | A47C 3/40 |

* cited by examiner

*Primary Examiner* — Alvin C Chin-Shue
(74) *Attorney, Agent, or Firm* — Sanchelima & Associates, P.A.; Christian Sanchelima; Jesus Sanchelima (57) ABSTRACT

A hunting blind coupled to a tree or on the ground for supporting a user at a tree is disclosed. The hunting blind comprises a front base bar, a first side bar, a second side bar, and a rear base bar forming a support base for the hunting blind. The hunting blind comprises upstanding bars coupled to the rear base bar. The hunting blind comprises a top bar coupled the upstanding bars. The hunting blind comprises a first rail bar and a second rail bar, the first rail bar is coupled to the top bar and the first side bar, and the second rail bar is coupled to the top bar and the second rail bar. The hunting blind comprises a frame provided in a L-shape, coupled to the rear base bar, a short end of the frame is provided towards the front base bar. The hunting blind comprises a plurality of straps to couple the frame, the top bar and the rear base bar to the tree. The hunting blind comprises a cover sheet spread on top of the hunting blind to conceal a user inside the hunting blind.

6 Claims, 7 Drawing Sheets

HUNTING BLIND

BACKGROUND OF THE INVENTION

1. Field of the Invention

The present disclosure generally relates to a hunting blind. More particularly, the present disclosure relates to a hunting blind coupled to a tree or on the ground for supporting a user such as a hunter, a wild life watcher, and a photographer.

2. Description of the Related Art

It is known that hunting blinds or tree stands, or tree-mounted hunting stands or ground stands or ground blinds are used by hunters, wild life watchers, photographers and the like for supporting or concealing them on a tree or on the ground. Typically, the hunting blinds include a support platform made of wood or plywood or suitable material. The hunting blind is secured to a tree at a distance e.g., 10-20 feet above the ground. The hunter may use a ladder to climb up and down from, the hunting blind. After climbing up, the hunter may use the support platform to sit or stand and may take photos or hunt the animals as desired.

The hunting blind may be either permanently or detachably positioned on the tree or on the ground. Generally, the hunting blind may include a seat, a rifle or bow support to conceal the hunter. It is known that the hunting blinds, at times require assistance of several persons to erect and take down. With improvements in designs of the hunting blinds, different hunting blinds have been proposed that are easy to erect and take down.

Several designs of the hunting blinds i.e., the tree stands have been disclosed in the past that are easy to erect and take down. One such example of the hunting blind is disclosed in a United States granted U.S. Pat. No. 7,958,968B1. In U.S. Pat. No. 7,958,968, a tree stand blind system for concealing a hunter on a tree stand and protecting the hunter from rain is disclosed. The tree stand blind system includes a pair of mounting brackets is secured to a tree adjacent a tree stand. Each of the mounting brackets has one of a pair of arms mounted thereto. A vertical orientation of each of the arms is adjustable with respect to the associated one of the mounting brackets. Each of the arms is positioned horizontally and extending outwardly from the tree. A suspension rod is insertable into each of the arms. A pair of blind curtains is suspended from the suspension rod. The blind curtains hang down from the suspension in a semi-circle around the tree stand to conceal the hunter on the tree stand.

Another example of the hunting blind is disclosed in a United States granted U.S. Pat. No. 9,179,666B1. In U.S. Pat. No. 9,179,666B1, a portable treestand blind for use in combination with a treestand to protect a hunter or nature watcher from the elements and to conceal the hunter or nature watcher from wildlife is disclosed. The treestand includes a frame and a platform at a lower portion thereof. The blind includes first and second telescoping poles, each having lower and upper ends, each pole having an upper and lower portion, each of the poles having a tether attached proximate the upper end. The tether is attached around the tree with the poles being bowed both forwardly and laterally under tension. The blind also includes a pole mount attached to a front edge of the platform and the pole mount has left and right receptacles respectively receiving the lower ends of the poles, with the poles each being forwardly angled at a first obtuse angle and laterally outwardly splayed at a second obtuse angle. A cover is wrapped about the poles and the frame, providing a covered space thereinside.

Although the hunting blinds or the tree stand blind system discussed above are easy to use, they have few problems. For example, it is difficult to assemble and disassemble the parts of the hunting blinds. Further, the hunting blinds discussed above may have to first assembled on ground and taken up to affix to the tree.

Other documents describing the closest subject matter provide for a number of more or less complicated features that fail to solve the problem in an efficient and economical way. None of these patents suggest the novel features of the present invention. Specifically, none of the disclosures in the art disclose a hunting blind coupled to a tree or on the ground for supporting a hunter that is easy to assemble and disassemble.

Therefore, there is a need in the art for a hunting blind coupled to a tree or on the ground for supporting a hunter that is easy to assemble and disassemble.

SUMMARY OF THE INVENTION

It is one of the main objects of the present invention to provide a hunting blind coupled to a tree or on the ground for supporting a hunter which is easy to assemble and disassemble and avoids the drawbacks of the prior art.

It is one object of the present invention to provide a hunting blind that can be assembled at certain distance above the ground or on the ground.

It is one object of the present invention to provide a hunting blind coupled to a tree or on the ground for supporting a user. The hunting blind comprises a front base bar, a first side bar, a second side bar, and a rear base bar forming a support base for the hunting blind. The hunting blind comprises upstanding bars coupled to the rear base bar. The hunting blind comprises a top bar coupled the upstanding bars. The hunting blind comprises a first rail bar and a second rail bar, the first rail bar is coupled to the top bar and the first side bar, and the second rail bar is coupled to the top bar and the second rail bar. The hunting blind comprises a frame provided in a L-shape, coupled to the rear base bar, a short end of the frame is provided towards the front base bar. The hunting blind comprises a plurality of straps to couple the frame, the top bar and the rear base bar to the tree. The hunting blind comprises a cover sheet spread on top of the hunting blind to conceal a user inside the hunting blind.

It is another object of the present invention to provide arm extensions to increase the width of the hunting blind.

It is another object of the present invention to provide support bars extended from the frame, the support bars are coupled to the arm extensions to increase the width of the hunting blind.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

The following detailed description is intended to provide example implementations to one of ordinary skill in the art, and is not intended to limit the invention to the explicit disclosure, as one or ordinary skill in the art will understand that variations can be substituted that are within the scope of the invention as described.

The present disclosure discloses a hunting blind coupled to a tree or on the ground for supporting a user. The hunting blind comprises a front base bar, a first side bar, a second side bar, and a rear base bar forming a support base for the hunting blind. The hunting blind comprises upstanding bars coupled to the rear base bar. The hunting blind comprises a top bar coupled the upstanding bars. The hunting blind comprises a first rail bar and a second rail bar, the first rail bar is coupled to the top bar and the first side bar, and the second rail bar is coupled to the top bar and the second rail bar. The hunting blind comprises a frame provided in a L-shape, coupled to the rear base bar, a short end of the frame is provided towards the front base bar. The hunting blind comprises a plurality of straps to couple the frame, the top bar and the rear base bar to the tree. The hunting blind comprises a cover sheet spread on top of the hunting blind to conceal a user inside the hunting blind.

Various features and embodiments of a hunting blind are explained in conjunction with the description of FIGS. 1-7.

Figure 1:
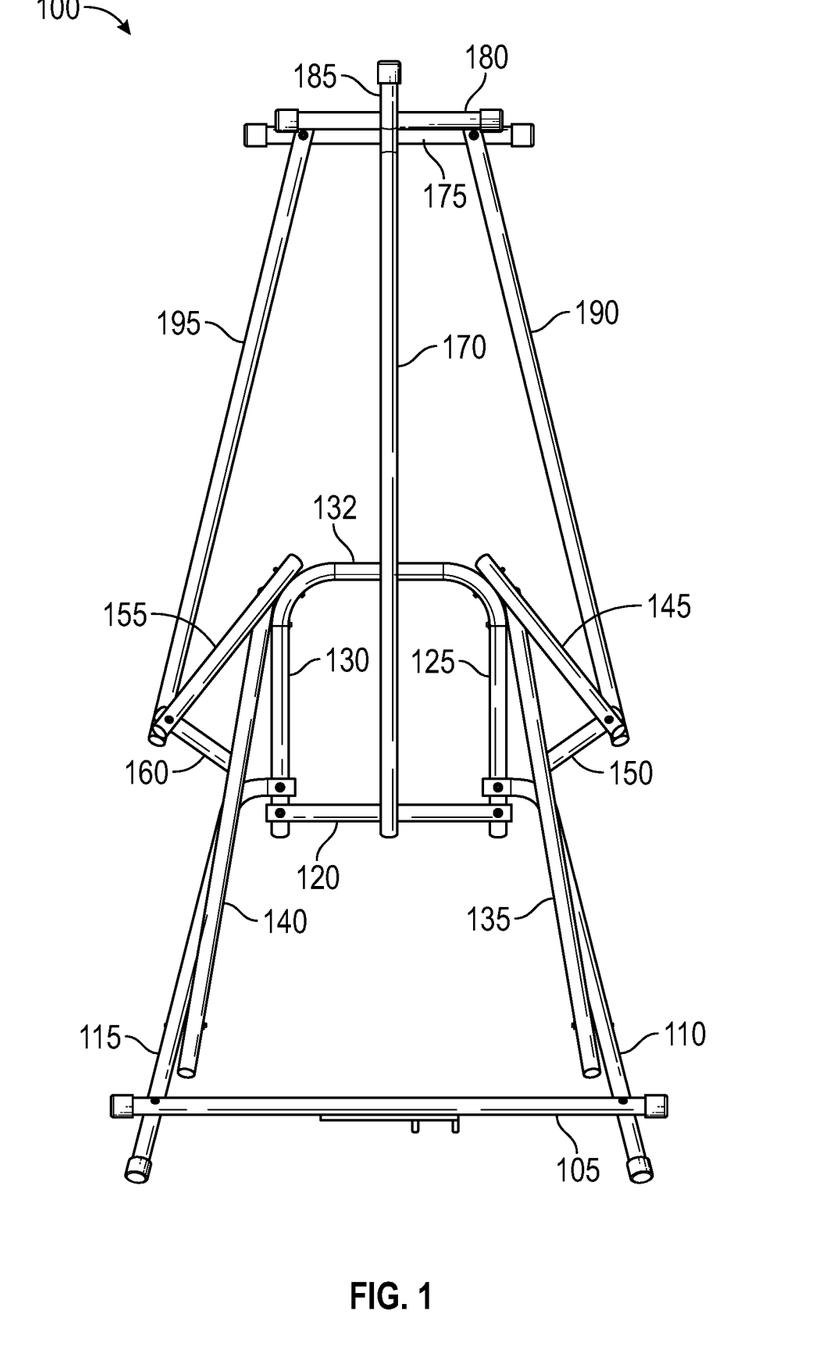
FIG. 1 illustrates a front view of a hunting blind 100, in accordance with one embodiment of the present disclosure.

Referring to FIG. 1, a front view of a hunting blind 100 is shown, in accordance with one embodiment of the present disclosure. The hunting blind 100 comprises a front base bar 105, a first side bar 110, and a second side bar 115. Further, the hunting blind 100 comprises a rear base bar 120. The front base bar 105 and the first side bar 110 are coupled using a first pin (not shown). Similarly, the front base bar 105 and the second side bar 115 are coupled using a second pin (not shown).

The rear base bar 120 is further provided with a first upstanding bar 125 and a second upstanding bar 130. The first upstanding bar 125 is coupled to the rear base bar 120 using a third pin (not shown). Further, the second upstanding bar 130 is coupled to the rear base bar 120 using a fourth pin (not shown). Further, the first side bar 110 is coupled to the first upstanding bar 125 using a fifth pin (not shown). Furthermore, the second side bar 115 is coupled to the second upstanding bar 130 using a sixth pin (not shown).

It should be understood that the front base bar 105, the first side bar 110, the second side bar 115, and the rear base bar 120 form a square or rectangular shape, and act as a base support for the hunting blind 100.

The hunting blind 100 further comprises a top bar 132 coupled to the first upstanding bar 125 and the second upstanding bar 130. In one example, the top bar 132 is coupled to the first upstanding bar 125 using a seventh pin (not shown). Further, the top bar 132 is coupled to the second upstanding bar 130 using an eighth pin (not shown).

Figure 2:
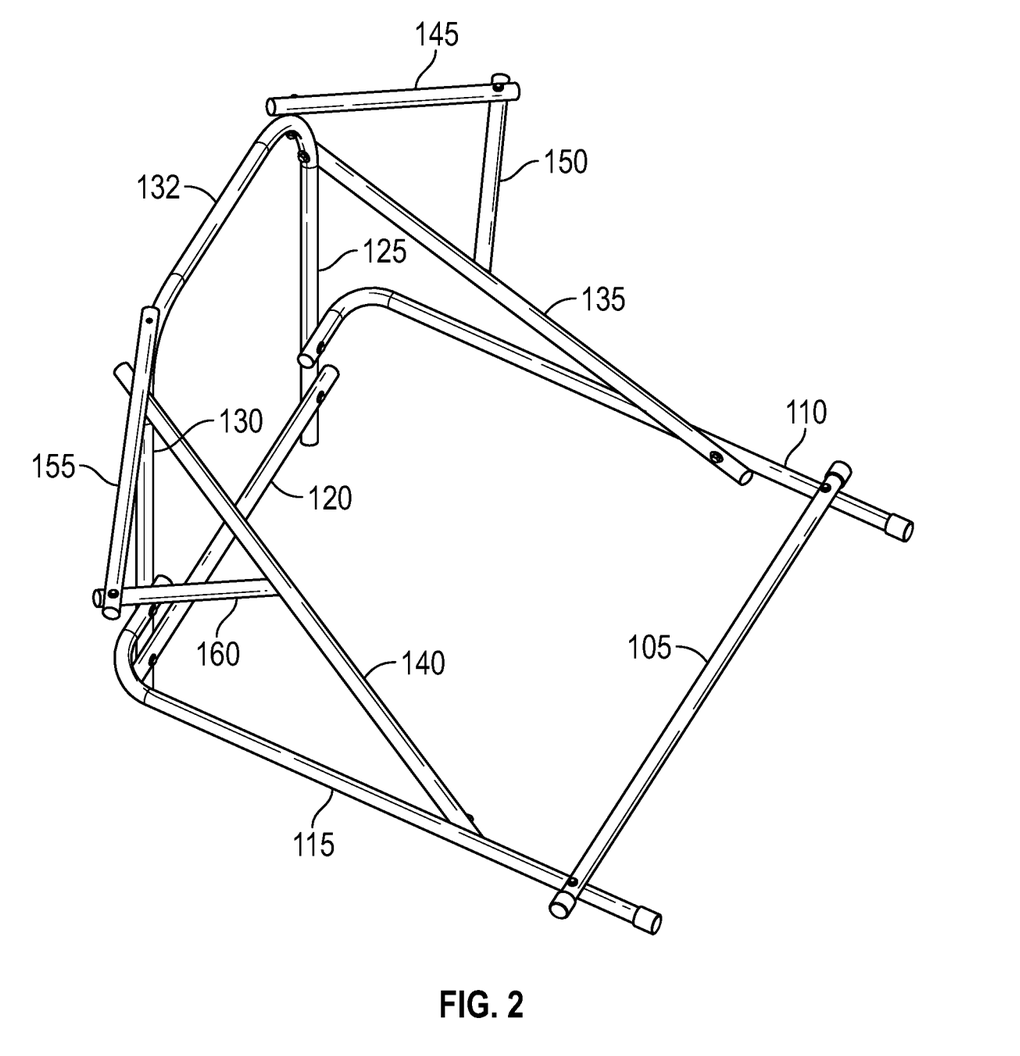
FIG. 2 illustrates a perspective (constructional) view of the hunting blind 100, in accordance with one embodiment of the present disclosure.

Now referring to FIG. 2, a perspective view of the hunting blind 100 is shown, to explain the constructional features. Referring to FIGS. 1 and 2, the hunting blind 100 comprises a first rail bar 135. The first rail bar 135 is coupled to the top bar 132 and the first side bar 110. In one example, the first rail bar 135 is coupled to the top bar 132 using a ninth pin (not shown). In another example, the first rail bar 135 is coupled to the top bar 132 using the seventh pin. The first rail bar 135 is coupled to the first side bar 110 using a tenth pin (not shown).

Further, the hunting blind 100 comprises a second rail bar 140. The second rail bar 140 is coupled to the top bar 132 and the second side bar 115. In one example, the second rail bar 1 is coupled to the top bar 132 using an eleventh pin (not shown). In another example, the second rail bar 140 is coupled to the top bar 132 using the eighth pin. The second rail bar 140 is coupled to the second side bar 115 using a twelfth pin (not shown).

Further, the hunting blind 100 comprises a first arm 145 coupled to the top bar 132. In one example, the first arm 145 is coupled to the top bar 132 using a thirteenth pin (not shown). The first arm 145 further comprises a second arm 150. The first arm 145 is coupled to the second arm 150 using a fourteenth pin (not shown). Further, the second arm 150 is coupled to the first rail bar 135 using a fiftieth pin (not shown). It should be understood that the top bar 132, the first arm 145, the second arm 150, and the first rail bar 135 forms a closed structure. It should be understood that the first arm 145 and the second arm 150 are provided at degrees, preferably which tilt outwardly to increase width of the hunting blind 100. The first arm 145 and the second arm 150 extend side wards (outwardly) and acts as arms extensions for the first rail bar 135.

Similarly, the hunting blind 100 comprises a third arm 155 coupled to the top bar 132. In one example, the third arm 155 is coupled to the top bar 132 using a sixteenth pin (not shown). The third arm 155 further comprises a fourth arm 160. The third arm 155 is coupled to the fourth arm 160 using a seventeenth pin (not shown). Further, the fourth arm 160 is coupled to the second rail bar 140 using an eighteenth pin (not shown). It should be understood that the top bar 132, the third arm 155, the fourth arm 160, and the second rail bar 140 forms a closed structure. It should be understood that the third arm 155 and the fourth arm 160 are provided at 45 degrees, preferably which tilt outwardly to increase width of the hunting blind 100. The third arm 155 and the fourth arm 160 extend side wards (outwardly) and acts as arms extensions for the second rail bar 140.

Figure 3:
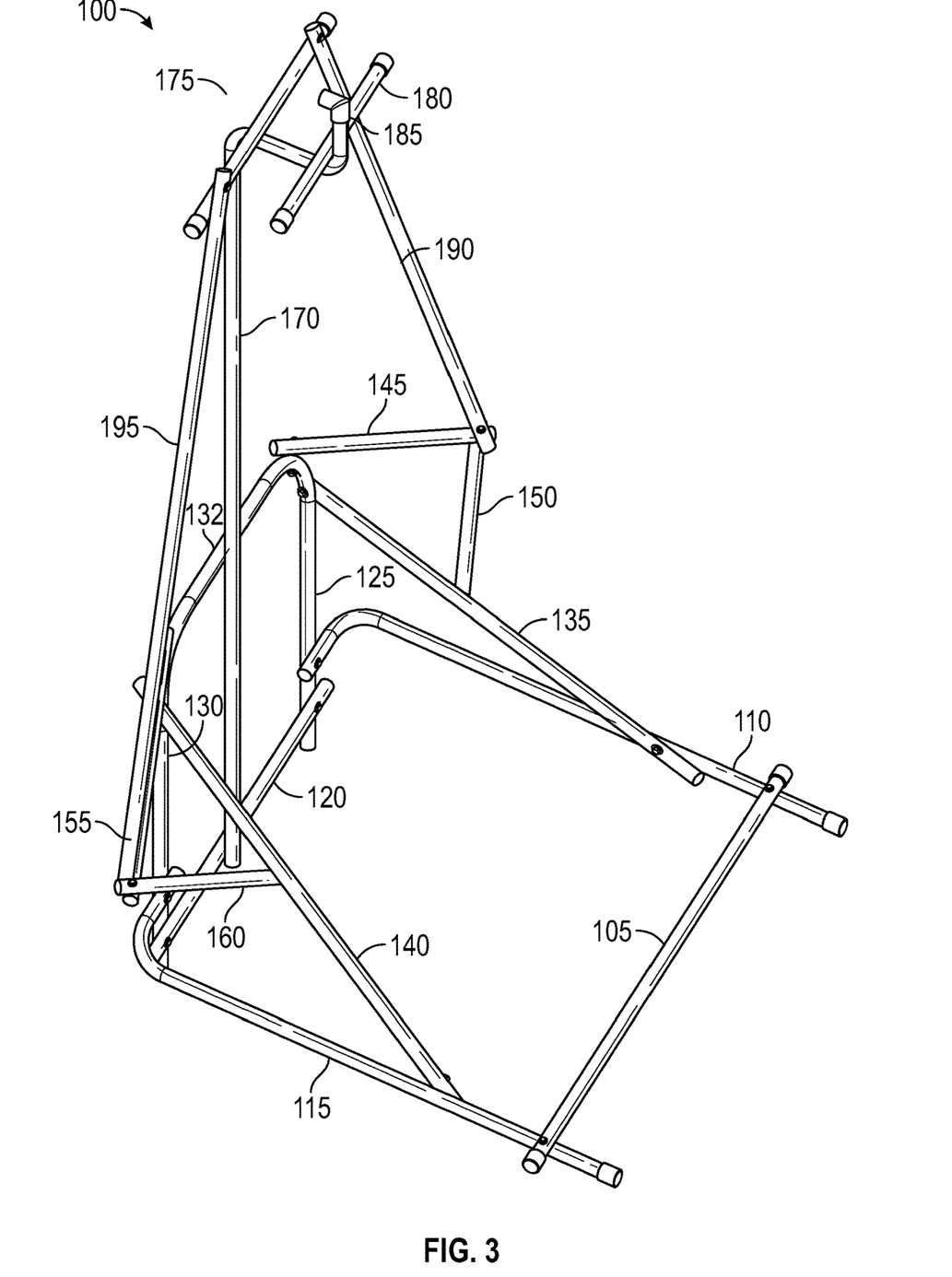
FIG. 3 illustrates a perspective view of the hunting blind 100, in accordance with one embodiment of the present disclosure.

Referring to FIG. 3, a perspective view of the hunting blind 100 is shown. As can be seen from FIGS. 1 and 3, the hunting blind 100 comprises a frame 170 extending from the rear base bar 120. The frame 170 may be provided in L-shape wherein the short end of the frame 170 is positioned towards the front base bar 105. In one example, the frame 170 of suitable length may be selected in L-shape extending from the rear base bar 120. In another example, the frame 170 may be provided in two parts, a first part extending from the rear base bar 120 till the top bar 132, and the second part provided in L-shape, such that the short end of the frame 170 (second part) is positioned towards the front base bar 105. The frame 170 is divided into two parts such that assembling, disassembling, and carrying the frame 170 from one place to another becomes easier.

Figure 4:
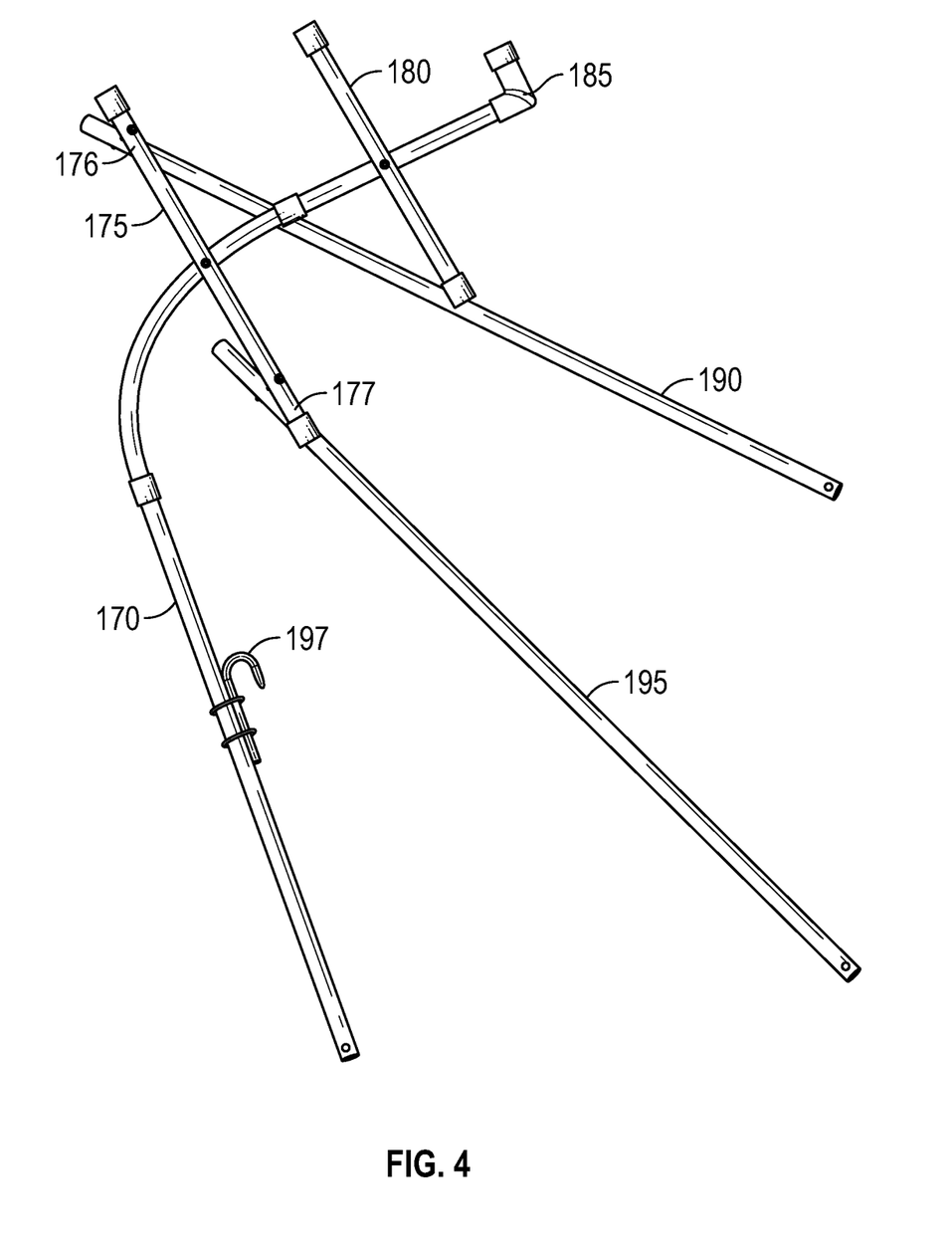
FIG. 4 illustrates a frame 170, in accordance with one embodiment of the present disclosure.

Referring to FIG. 4, the frame 170 (shown in FIG. 3) comprising a third bar 175 and a fourth bar 180 is shown, in accordance with one embodiment of the present disclosure. The third bar 175 and the fourth bar 180 are provided at the short end of the frame 170. In one example, the third bar 175 is coupled to the frame 170 using a nineteenth pin (not shown). Further, the fourth bar 180 is coupled to the frame 170 using a twentieth pin (not shown). The third bar 175 and the fourth bar 180 are placed horizontally to the base support i.e., the front base bar 105, the first side bar 110, the second side bar 115, and the rear base bar 120. In one example, the third bar 175 comprises a first end 176 and a second end 177. In addition, the frame 170 comprises a tip 185 provided at free end of the frame 170.

As can be seen in FIG. 4, the third bar 175 is provided with a first support bar 190. Specifically, the first support bar 190 is provided at the first end 176 of the third bar 175. In one example, the first support bar 190 may be coupled to the third bar 175 using a twenty-first pin (not shown). The first support bar 190 is coupled to the first arm 145 and the second arm 150 using the fourteenth pin.

Similarly, the third bar 175 is provided with a second support bar 195. Specifically, the second support bar 195 is provided at the second end 177 of the third bar 175. In one example, the second support bar 195 may be coupled to the third bar 175 using a twenty-second pin (not shown). The second support bar 195 is coupled to the third arm 155 and the fourth arm 160 using the seventeenth pin.

In one example, the frame 170 may comprise a hook 197 as shown in FIG. 4. The hook 197 may be used to hang items such as gun, utilities, camera, harness, straps and so on.

Figure 5:
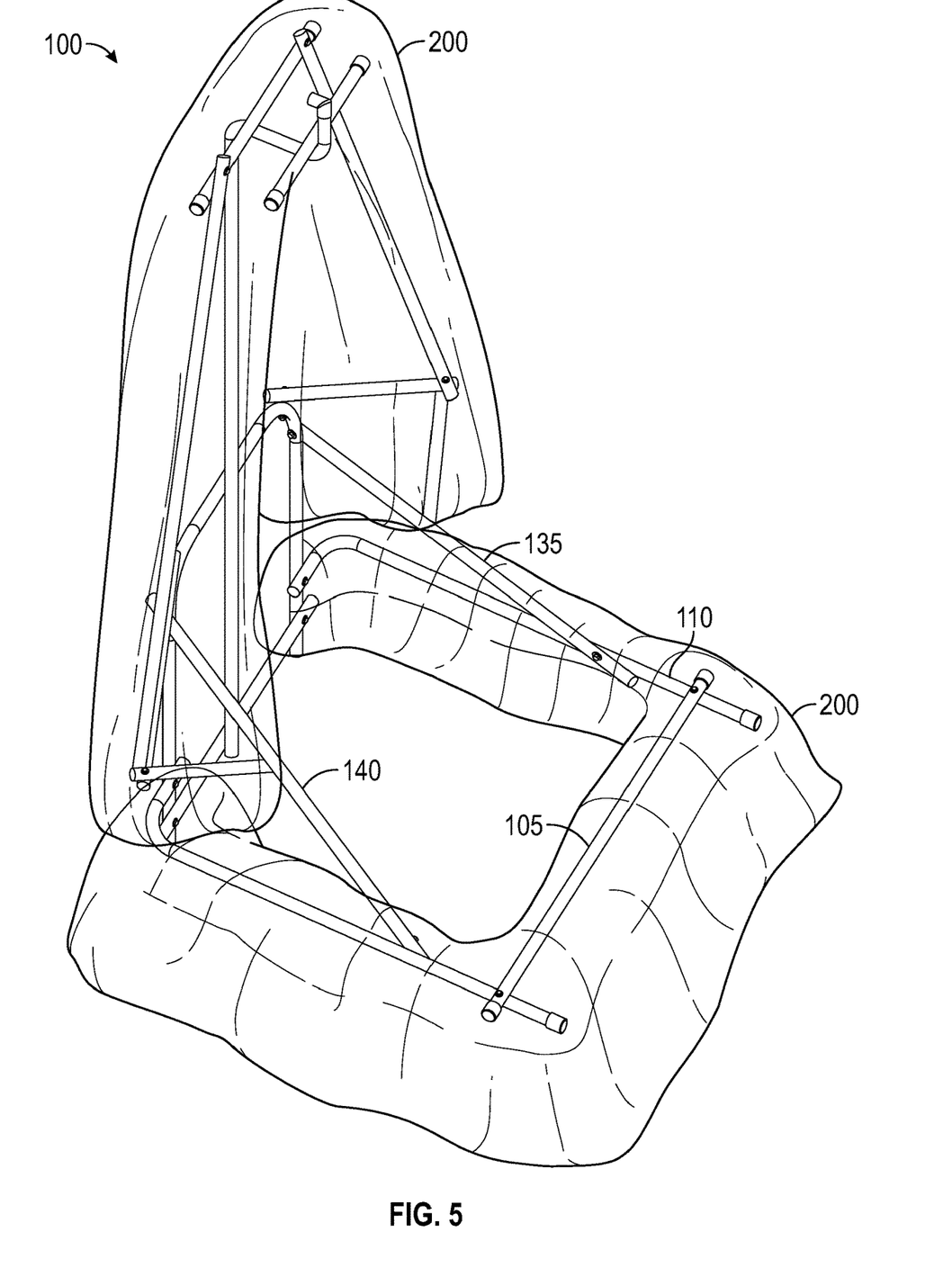
FIG. 5 illustrates a perspective view of the hunting blind 100 comprising a cover sheet 200, in accordance with one embodiment of the present disclosure.

Referring to FIG. 5, a perspective view of the hunting blind 100 comprising a cover sheet 200 is shown, in accordance with one embodiment of the present disclosure. It should be understood that the cover sheet 200 is placed on the hunting blind 100 to conceal the hunting blind 100 and the hunter. In one example, the cover sheet 200 may include a camouflage wrap or camouflage sheet which facilitates in concealing in trees or forest. It should be noted that the cover sheet 200 may be made using variety of materials. For example, the cover sheet 200 may be made using a cloth or netting and so on. Further, the cover sheet 200 may be using a water repellent material or using an open knitted cloth. It should be understood that the cover sheet 200 is placed on the third bar 175, the fourth bar 180 and the tip 185. Further, the cover sheet 200 is placed on the first support bar 190 and the second support bar 195 covering the arms extensions i.e., the first arm 145, the second arm 150, the third arm 155, the fourth arm 160, the first rail bar 135 and the second rail bar 140. Further, the cover sheet 200 is placed on the first side bar 110, the second side bar 115 and the front base bar 105. After placing the cover sheet 200, clips or hooks (not shown) may be used to secure the cover sheet 200 to each part of the hunting blind 100.

Figure 6:
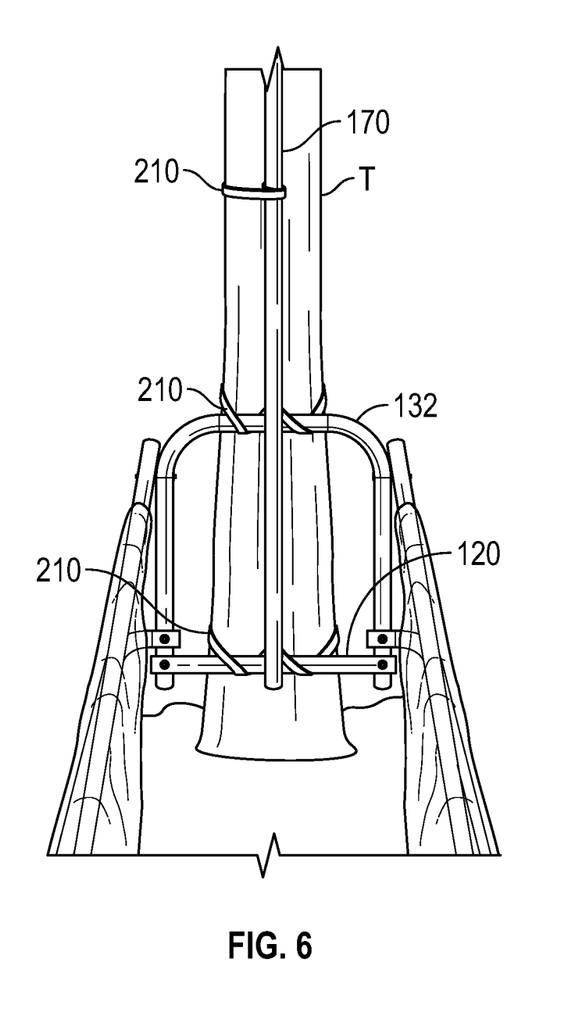
FIGS. 6 and 7 illustrate a front and a perspective of the hunting blind 100 coupled to a tree T, in accordance with one embodiment of the present disclosure.
Figure 7:
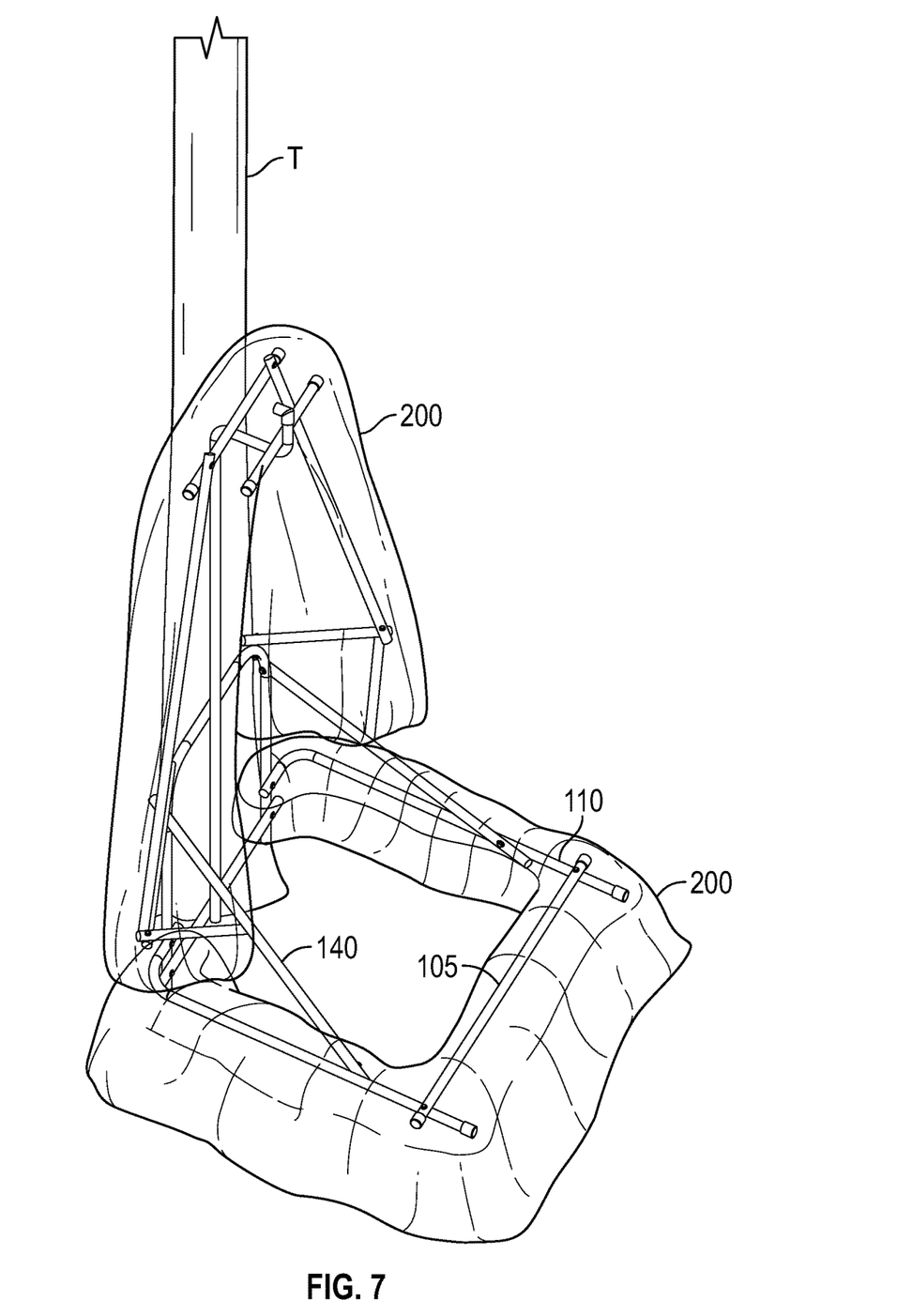

Referring to FIGS. 6 and 7, constructional and operational features of the hunting blind 100 are explained, in accordance with one embodiment of the present disclosure. Specifically, FIG. 6 shows a front view of the hunting blind 100 coupled to a tree T. In order to couple the hunting blind 100 coupled to the tree T, a user of the hunting blind 100 may assemble the hunting blind 100 on ground and climb up a ladder to attach the hunting blind 100 to a tree T. In another example, the user may climb up the tree T, and put a harness (not shown) to have a proper support. Subsequently, the user may assemble the hunting blind 100 as explained above. In one example, the user may assemble the hunting blind 100 to the tree T at a distance e.g., 10-20 feet above the ground. The length of the hunting blind 100 is adjusted such that the user is concealed at sitting posture or at standing posture.

In order to couple the hunting blind 100 to the tree T, the user may use a plurality of straps 210. As can be seen from FIG. 6, the plurality of straps 210 may be used to attach the hunting blind 100 to the tree T. In one example, the strap 210 is used to couple the frame 170 to the tree T. Further, the strap 210 is used to couple the top bar 132 to the tree T. Furthermore, the strap 210 is used to couple the rear base bar 120. Furthermore, the strap 210 may be used to couple the tree T to the first side bar 110, the second side bar 115 to provide support for the hunting blind 100.

Referring to FIG. 7, a perspective view of the hunting blind 100 coupled to tree T in which the cover sheet 200 is placed on the hunting blind 100 is shown. As explained above, the cover sheet 200 is placed on the hunting blind 100 and the clips or the hooks are used to secure the cover sheet 200 to each part of the hunting blind 100.

In order to disassemble the hunting blind 100, the user may remove the pins used to couple the parts. After removing, the user may carry the hunting blind 100 from one place to another. It should be understood that the user might disassemble (each part) the hunting blind 100 at the tree (i.e., at 10-20 feet above the ground) with the help of the harness. In other example, the user may release the straps 210 to decouple the hunting blind 100 and bring down the hunting blind 100 to the ground. After bringing down the hunting blind 100, the user may remove the pins and separate each part of the hunting blind 100.

Further, each part of the hunting blind 100 may be made up of wood, plywood, plastic, metal or any other suitable material.

As explained above, height of the hunting blind 100 may be adjusted based on sitting or standing posture of the user. Further, the size of the cover sheet 200 may be selected as desired by the user to conceal him with the help of the hunting blind 100. It should be understood that the user may include but not limited to a hunter, a wild life watcher, a photographers and the like.

Although the disclosure is provided to use pins to couple the parts of the hunting blind 100, it should be understood that fasteners might also be used to couple the parts of the hunting blind 100. Further, the number of pins used to couple the parts is provided for illustrative purpose only and should not construed in limited sense. The number of pins used may be decreased or increased based on the requirement of the user. In another example, each part of the hunting blind 100 as explained above may also be welded to form a permanent structure at the tree T. Further, it should be understood that fasteners may be used to couple certain parts or components of the hunting blind and pins may be used to couple remaining parts of the hunting blind. Alternatively, certain parts might also be welded such that assembling and disassembling of the hunting blind becomes easier for the hunter.

In one exemplary implementation, the front base bar may be provided as two parts connecting via a connecting means (not shown). In one example, the connecting means may be provided at center of the front base bar. The front base bar is provided as two parts such that each of the two parts may be swing opened at the time of assembling and disassembling the hunting blind.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A hunting blind, comprising:
    a front base bar, a first side bar, a second side bar, and a rear base bar forming a support base for the hunting blind;
    upstanding bars coupled to the rear base bar;
    a top bar coupled the upstanding bars;
    a first rail bar and a second rail bar, wherein the first rail bar is coupled to the top bar and the first side bar, wherein the second rail bar is coupled to the top bar and the second rail bar;
    a frame provided in a L-shape, is coupled to the rear base bar, a short end of the frame is provided towards the front base bar;
    a plurality of straps to couple the frame, the top bar and the rear base bar to a tree; and
    a cover sheet spread on top of the hunting blind to conceal a user of the hunting blind; further comprises arm extensions provided at the top bar and first rail bar, and the top bar and second rail bar.

2. The hunting blind of claim 1, wherein the frame comprises a third bar and a fourth bar placed horizontally.

3. The hunting blind of claim 2, wherein the third bar comprises a first support bar and a second support bar.

4. The hunting blind of claim 3, wherein the first support bar is coupled to the arm extensions provided at the top bar and first rail bar.

5. The hunting blind of claim 3, wherein the second support bar is coupled to the arm extensions provided at the top bar and second rail bar.

6. The hunting blind of claim 1, further comprises clips to secure the cover sheet to the rear base bar, the first rail bar, the second rail bar, and the front base bar.

* * * * *